United States Patent [19]

Mori et al.

[11] 4,366,479
[45] Dec. 28, 1982

[54] CONTROL INFORMATION COMMUNICATION METHOD AND SYSTEM THROUGH A COMMON SIGNAL TRANSMISSION LINE

[75] Inventors: Kinji Mori, Sagamihara; Hirokazu Ihara, Machida, both of Japan

[73] Assignee: Hitachi, Ltd., Tokyo, Japan

[21] Appl. No.: 232,006

[22] Filed: Feb. 6, 1981

[30] Foreign Application Priority Data

Feb. 8, 1980 [JP] Japan .................................. 55-13725

[51] Int. Cl.³ ........................................... H04Q 5/00
[52] U.S. Cl. ................................. 340/825.05; 370/86; 370/94; 340/825.04
[58] Field of Search ..................... 340/825.05, 825.04; 370/86, 94

[56] References Cited

U.S. PATENT DOCUMENTS

| | | | |
|---|---|---|---|
| 3,633,166 | 1/1972 | Picard ........................... | 340/825.05 |
| 3,971,892 | 7/1976 | Schlichte ........................ | 370/86 |
| 4,002,842 | 1/1977 | Meyr et al. ..................... | 370/86 |
| 4,225,753 | 9/1980 | Chown et al. ................... | 370/86 |

Primary Examiner—Donald J. Yusko
Attorney, Agent, or Firm—Antonelli, Terry & Wands

[57] ABSTRACT

Transmission and communication of control information through a common signal transmission line are performed with a high transmission efficiency by the use of a control data signal including a content code signal portion and a sub-data signal portion but no address signal portion. The content code signal portion and the sub-data signal portion are representative of a brief content and a supplemental content of control forming in combination control data in the control data signal, respectively. A station with which an equipment is connected and which is coupled with the common transmission line contains at least one content code data so that when the content code signal portion of the control data signal is concurrent with one of the at least one content code data the equipment takes the control data signal for performing the control defined by the control data formed by content code and the sub-data signal portions of the received signal. The equipment is also capable of transmitting a control data signal similar to the above-mentioned one to the common transmission line.

23 Claims, 3 Drawing Figures

CONTROL INFORMATION COMMUNICATION METHOD AND SYSTEM THROUGH A COMMON SIGNAL TRANSMISSION LINE

BACKGROUND OF THE INVENTION

The present invention relates to a method and a system of communicating or transmitting control data among a plurality of equipments (e.g. computers and I/O devices) coupled to a common signal transmission line.

Heretofore, when control data is to be exchanged among equipments through a common transmission line, transmitting equipment transmits data having a destination address for specifying a receiving equipment added to the control data and the receiving equipment determines whether the destination address specifies the receiving equipment itself. If specified, the receiving equipment receives the control data including its own address to control its associated terminals based on the received data. A control system of this kind is disclosed, for example, in Japanese Patent Application Laid-Open No. 2363/76 laid open on Jan. 9, 1976. Thus, in the prior art, the addresses which are not used for control have been also transmitted. As a result, the amount of information to be transmitted and received is large and the performance of transmission is degraded.

SUMMARY OF THE INVENTION

The present invention is intended to alleviate the drawbacks encountered in the prior art and it provides a method and system of transmitting or communicating control data to or with desired destination equipments without transmitting any destination addresses.

In the present invention, a transmitting equipment transmits a control data signal including a content code signal portion representing a brief content of control of the data control signal and a sub-data signal portion representing a supplemental content of control for use in combination with the brief content to form control data in the control data signal to a common signal transmission line without attaching any address for specifying a receiving equipment, and a receiving equipment compares one of the plurality of previously registered content code data with the content code signal portion of the received control data signal from the signal transmission line. Only when the content code signal portion is concurrent with one of the content code data the receiving equipment takes the content code portion and sub-data signal portion (parameter data related thereto) of the control data signal as control data for that equipment.

DESCRIPTION OF THE PREFERRED EMBODIMENTS

The content code represents a brief content of or a general concept of control and it is used to classify control items or data into finite groups (for example 30 groups). The number of content codes is limited. On the other hand, the sub-data accompanies the content code and it contains variable parameter data to supplement the concept of the content code by numerals or the like to form control data together with the content code. The number of control modes which the sub-data can specify is substantially infinite.

As an example, the content codes and the sub-data of control data for a train transportation system may be as shown in Table 1.

TABLE 1

| Control Data | Content Code | Sub-Data |
|---|---|---|
| Opening time is 4:30 | Opening time code | Data representing 4:30 |
| Closing time is 23:50 | Closing time code | Data representing 23:50 |
| Train #M5 got faulty at station F at 12:00 | Train accident code | Data representing station F, train #M5 and 12:00 |
| Train #M10 left station G at 12:30 | Train tracking code | Data representing station G, train #M10 and 12:30 |
| Speed of train #M3 is 60 Km/hour. | Train speed code | Data representing train #M3 and 60 Km |
| . | . | . |
| . | . | . |
| . | . | . |

An embodiment of the present invention will now be explained in detail with respect to the transmission system through a common loop transmission line.

Figure 1:
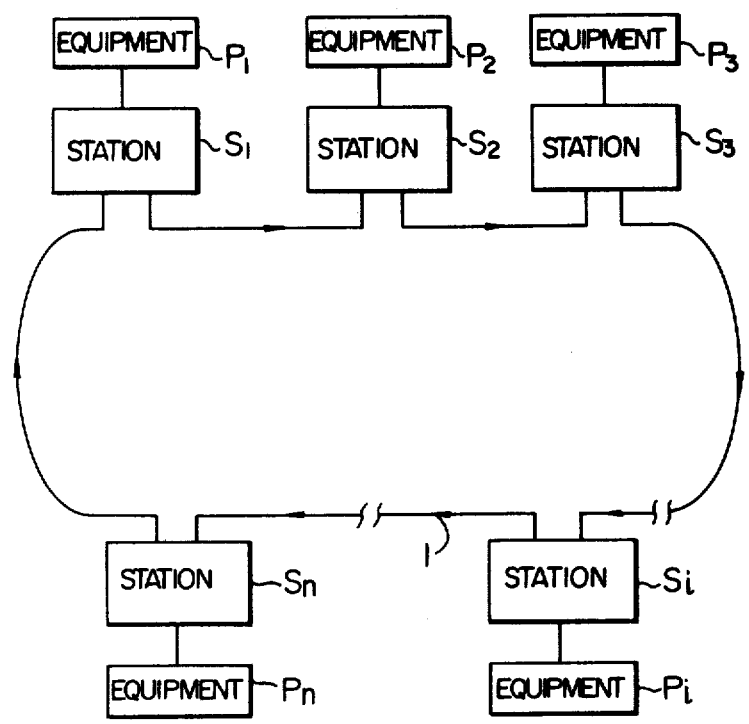
FIG. 1 shows an overall configuration of a loop transmission system.

FIG. 1 shows an overall configuration of the loop transmission system. Equipments $P_1, P_2, \ldots P_n$ are connected with stations $S_1, S_2, \ldots S_n$, respectively, which are coupled to a common loop transmission line.

As an example, let us assume that the i-th equipment $P_i$ is to send a control data signal including a sub-data signal portion D and a content code signal portion C forming a control data in the control data signal to the transmission line 1. The station $S_i$ receives the control data signal including D and C from the equipment $P_i$ and it adds thereto number i assigned to the transmitting equipment and flags F representing the beginning and the end of the control data signal to form a packet of information shown in FIG. 2, which is then sent to the loop transmission line 1. Stored in a memory (not shown) of each station is at least one predetermined content code data representative of a brief content of control for which the equipment connected with the station is responsible. While the packet information circulates through the loop transmission line, each of the stations except the station $S_i$ compares each of the content code data stored therein with the content code signal portion C which is transmitted through the loop transmission line 1, and only when they are concurrent with each other the station supplies the control data signal including the content code signal portion C and the sub-data signal portion D to the equipment connected thereto. Irrespective of whether the concurrence takes place or not at the comparison, each station relays the received packet information to the right-adjacent station. When the packet information has been circulated through the loop and comes back to the station $S_i$, the station $S_i$ detects that the number i for the transmitting equipment sending the packet information is identical to the number i for the station $S_i$ and removes the packet information transmitted clockwise from the loop transmission line 1.

Figure 3:
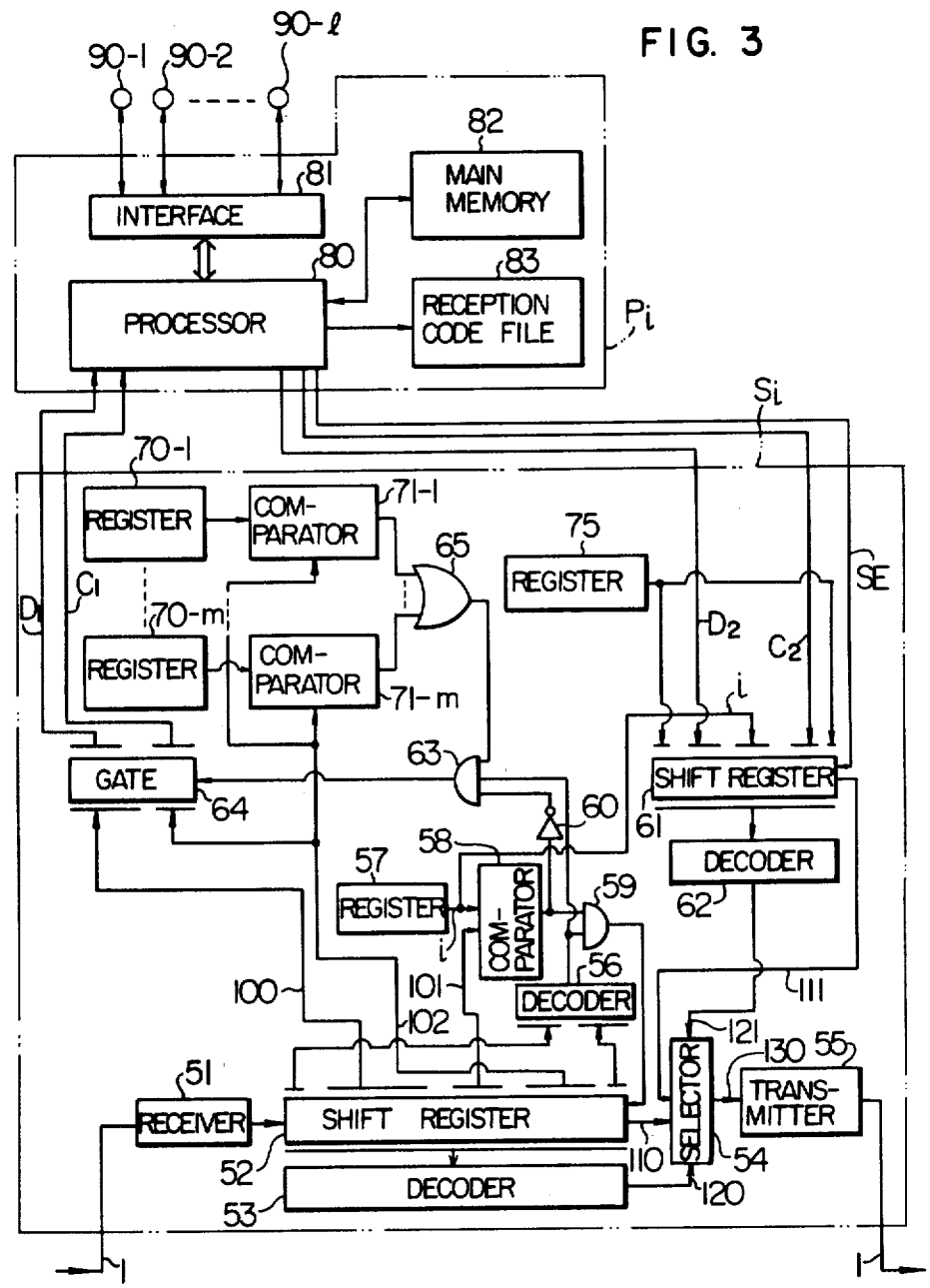
FIG. 3 is a block diagram of the main portion of an embodiment of the present invention.

FIG. 3 shows an example of a specific construction of the station and the equipment. In the illustrated embodiment, the i-th station and equipment are shown. Receiving operation and transmitting operation are now explained.

(1) Receiving operation

It is assumed that the loop transmission line 1 is carrying a control data signal or a packet of information including flag F representing the beginning of a content code signal portion $C_1$, the number for the transmitting equipment x, sub-data signal portion $D_1$ and flag F representing the end of data. A selector 54 in the station $S_i$ serves to connect signal lines 110 and 130 together when signals on signal lines 120 and 121 are in "0" and "0" states or in "1" and "0", connect signal lines 111 and 130 together when the signals are in "0" and "1" states and maintain the previous connection when the signals are in "1" and "1" states. It is now assumed that the signals on the signal lines 120 and 121 are in "0" and "0" states and hence the signal lines 110 and 130 are connected together by the selector 54.

The packet information is sequentially applied to a shift register 52 via a receiver 51 in the station $S_i$. The number of stages of the shift register 52 corresponds to the number of bits of the packet information. A decoder 56 produces a "1" output when the flags F are loaded to areas F of the shift register 52 representing the beginning and the end of data, and otherwise produces a "0" output.

Signal lines 100, 101 and 102 carry information or data concerned with sub-data area, transmitting equipment number area and content code area of the shift register 52, respectively. Preloaded on a register 57 by a processor 80 (in equipment $P_i$) is the number i for the station $S_i$. A signal line for this loading is not shown in the drawing. A comparator 58 compares the information of the transmitting equipment number sent over the signal line 101 with the number i is stored in the register 57 and produces a "1" output when they are identical and a "0" output when they are not identical. Only when the entire packet information has been loaded on the shift register 52 and the transmitting equipment number x for the packet information is identical with the number i for the station, an AND gate 59 produces a "1" output. The output of the AND gate 59 is coupled to a reset terminal of the shift register 52. Accordingly, only when the packet information is fully loaded on the shift register 52 by being shifted bit by bit, and at the same time, the transmitting equipment number x for the packet information is identical with the number i, the shift register 52 is reset. The packet information returned after the circulation is thus removed from the loop transmission line 1.

When the transmitting equipment number x and the number i for the station $S_i$ are not identical, the shift register 52 is not reset and as the shift register 52 shifts its content the packet information is relayed to the loop transmission line 1 through the selector 54 having selected the signal line 110 and a transmitter 55.

Stored in registers (for example 5-bit registers) 70-1, . . . , 70-m are content code data $C_{i1}$, . . . , $C_{im}$ represent brief contents of control for which the equipment $P_i$ is responsible. Comparators 71-1, . . . , 71-m compare the data in the content code area of the shift register 52 (the content code signal portion of the received control data signal) with $C_{i1}$, . . . , $C_{im}$, and produce "1" output when they are identical and "0" output when they are not identical.

The outputs of the comparators 71-1, . . . , 71-m are applied to an OR gate 65, the output of which is applied to an AND gate 63, which also receives the output of the decoder 56 and an inverted output of the comparator 58 through an inverter 60.

Accordingly, the AND gate 63 produces a "1" output only when the entire packet information has been loaded on the shift register 52, the transmitting equipment number x is not identical with the station number i and the content code signal portion $C_1$ of the received control data signal is concurrent with one of the content code data $C_{i1}$, . . . , $C_{im}$ previously stored in the registers 70-1, . . . , 70-m, and otherwise produces a "0" output. The output of the AND gate 63 is applied to a gate 64 connected with the shift register 52 so that the gate 64 is opened only when the output of the AND gate 63 is in "1" state to pass the sub-data signal portion $D_1$ and the content code signal portion $C_1$ sent over the signal lines 100 and 102 to the equipment $P_i$. After the above process, the content of the shift register 52 is shifted. In this manner, of the received control data signal (packet information) only the content code signal portion $C_1$ which is concurrent with one of the preset content code data $C_{i1}$, . . . , $C_{im}$ is supplied along with the sub-data signal portion $D_1$ to the equipment $P_i$ from the loop transmission line 1.

In the equipment $P_i$ connected with the station the processor 80 now receives the content code signal portion $C_1$ and the sub-data signal portion $D_1$. A reception code file 83 which may be a part of a main memory 82 has instruction programs previously stored to be executed in accordance with the data of the content code signal portions and has an address table for translation of the headers of the data of the content code signal portions to corresponding instruction programs. The processor 80 compares the content code signal portion received from the station $S_i$ with the content codes in the address table and reads out a heading address of the instruction program stored at a location corresponding to the content code which has been proved identical with the content code signal portion. Based on the heading address, the processor 80 reads out the instruction program to be executed from the reception code file 83 and processes the sub-data signal portion $D_1$ using the main memory 82. Based on the process results, it produces an instruction signal for controlling external terminals 90-1, 90-2, . . . , 90-l through an interface 81.

The equipments in the train transportation system may include substations, railway stations and control center facilities. When the equipment is a railway station, the external terminals thereof may include shutter control devices for the railway station, broadcasting devices, light turn-on control devices, alarms and signalling devices. In the railway station facilities, the content code representing the opening time is converted to an instruction program for opening the shutters for the railway station, and in the substation it is converted to an instruction program for controlling the turn-on of the switches for feeding electric power. In other words, the instruction programs for one content code in the reception code file 83 are made variable depending upon the types of the equipments which may be connected with various facilities and the external terminals.

(2) Transmitting operation

The processor 80 in the equipment $P_i$ functions to start a predetermined program on the basis of an external input signal supplied from one of external terminals 90-1, 90-2, . . . , 90-l, which are connected to the equipment $P_i$, through an interface 81 (or on the basis of the data supplied from the transmission line 1 in the receiving operation mode). A particular content code is determined as a result of the programmed processing. In case the control data signal flowing in the transmission line 1 is concerned with two systems, e.g., a train transportation system and a substation system, and the data for the train transportation system is as shown in Table 1. When the content code has eight bits, the most preceding two bits determine a large group classification of the data. That is, when the two bits are "00", "01", "10" and "11", the code content is concerned with the train transportation system, the substation system, both of the two systems and the system test, respectively. The remaining six bits determine a small group classification of the data. For example, the five content codes listed in Table 1 may be represented by "000001", "000010", . . ., "000101", respectively.

Referring further to Table 1, the Opening time code and the Closing time code are produced as an output result of the processing on the basis of an opening program and closing program executed by the processor 80 started by inputs from buttons 90-1 and 90-2 on a console installed in a central instruction office. The Train accident code is produced as an output result of the processing on the basis of a train accident disposition program executed by the processor 80 started by a button 90-3 on a console in a railway station. The Train tracking code is produced as an output result of the processing on the basis of a train tracking program executed by the processor 80 started by the outputs of track circuits 90-4 to 90-i for each railway station. The track circuits are provided to each railway station and serve as devices for detecting the locations of trains. Each railway station has two or more track circuits. Thus, the output result by the train tracking program provides train location information. The train speed code is produced as a result of computation of a current train driving condition and then train running speeds therefrom in consideration of the train diagram on the basis of a train drive adjusting program executed by the processor 80 in a central instruction office, the processor 80 being started with train tracking data received from the loop transmission line 1.

Figure 2:
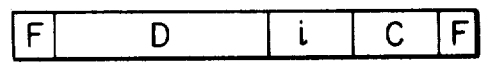
FIG. 2 shows a format of a packet of information flowing in a loop transmission line in accordance with an embodiment of the present invention.

The processor 80 applies a set signal SE to a set terminal of the shift register 61 and it also supplies a content code $C_2$ (produced as described above) and a sub-data $D_2$ to the corresponding areas of the shift register 61 for forming a packet information such as shown in FIG. 2. Prestored in the register 75 by the processor 80 are flags F representing the beginning and the end of a control data signal. A signal line for presetting such flags is not shown in the drawing. The number i for the station $S_i$ and the flags F are applied to the shift register 61 from the registers 57 and 75, and a packet information to be transmitted comprising the flag F, the content code $C_2$, the transmitting equipment number i, the sub-data $D_2$ and the flag F such as shown in FIG. 2 is loaded on the shift register 61 with a timing of the set signal SE.

The decoder 62 produces a logical sum of the outputs from all of the bits of the shift register 61, so that it decodes the information loaded on the shift register 61 and supplies a "1" output to the selector 54 whenever the shift register 61 contains any information, and provides a "0" output when the bits of the shift register 61 are all zero because of all the bit information therein having been shifted out. The decoder 53 produces a logical sum of the outputs from the bits of the shift register 52, so that it decodes the information loaded on the shift register 52 and provides a "1" output to the selector 54 whenever the shift register 52 contains any information, and provides a "0" output when the shift register 52 does not contain any information (that is, when all bits of the shift register 52 are zero).

The selector 54 has a function to selectively provide one of the outputs of the shift registers 52 and 61 to the transmitter 55. It selects the outputs of the shift register 61 when the output of the decoder 53 is "0" and the output of the decoder 62 is "1". Thus, when the information in the shift register 52 is shifted out, the shift register 61 on which the packet information has been loaded starts to shift and the output therefrom is supplied to the loop transmission line 1 through the selector 54 and the transmitter 55. When the output of the decoder 62 assumes "0" (that is, when all bits of the shift register are zero because of the packet information loaded on the shift register 61 having been shifted out), the selector 54 resumes a state in which the output of the shift register 52 is selected. In this manner, the packet information can be carried on the loop transmission line without overlapping with another packet information being carried on the loop transmission line 1.

The equipment $P_i$ may include a microprocessor programmed to perform processes necessary for the above-described receiving and transmitting operations.

The circuit configurations of the respective stations may be identical so that they are implemented in an LSI structure. The reception code file 83 may be constructed by a non-volatile memory such as a read-only memory so that the information is not lost even when power fails.

The station $S_i$ may comprise the receiver 51, the transmitter 55, a buffer memory in place of the shift register 52, a random access memory in place of the shift registers 57, 70-1, . . . , 70-m, 75, a processor for controlling the station itself and the interface for association with the equipment $P_i$.

As described hereinabove, according to the present invention, the control data signal includes the content code signal portion representing the brief content of control of the signal and the sub-data signal portion representing a supplemental content of control for use in combination with the brief content to form control data, wherein the content code is not only used to control the equipment as a part of control data for use together with the sub-data but also is used as the code to specify the destination equipment. Accordingly, an address for specifying the destination is not necessary and the transmission of control information with less redundancy and hence high transmission performance is attained.

We claim:

1. A method of communicating control information through a common signal transmission line to which a plurality of stations are coupled, each of said stations having a unique station address and being in turn connected with a respective equipment for control of external terminals connected thereto and for reception of external input signals therefrom, the method comprising:

producing in one of said stations a control data signal containing no portion identifying the unique station address of any other station in response to an external input signal from one of said external terminals connected with the equipment connected to said one station, said control data signal including a content code signal portion representative of one of a plurality of different control operations and a sub-data signal portion made up of data associated with the control operation designated by the content code signal portion;

sending said control data signal from said one station via said common transmission line to all other stations connected to said line;

storing in each of said stations a plurality of content codes representative of selected control operations for which its associated equipment is responsible;

receiving at each of said other stations said control data signal sent from said one station via said common transmission line;

comparing in said other stations the content code signal portion of said received control data signal with each of said plurality of stored content codes to determine whether any one of said stored content codes is concurrent with said content code signal portion; and producing in the equipments connected to said other stations an instruction signal, only when a concurrence is determined by said comparison, for effecting control defined by the control data formed by the concurrent content code data signal portion and the sub-data signal portion of said received control data signal.

2. A method according to claim 1, wherein said stations are connected in series to said common transmission line and said control data signal sent by said one station includes an address portion corresponding to the unique station address of said one station, and further comprising storing in each station an address code corresponding to the unique address of that station;

comparing in each station the address portion of a control data signal received from said common transmission line with the address code stored at said station; and re-sending on said common transmission line from any station a received control data signal only when the address portion thereof does not correspond to the address code stored at the respective station, so that a given control data signal is passed along said common transmission line from station to station until it returns back to the sending station.

3. A method for transmitting information among a plurality of stations each having a unique station address, connected to a common transmission line, comprising the steps of:

transmitting, from one station, information over said common transmission line, said information including a first code portion selected from a plurality of predetermined codes for identifying the contents of said information and a second data portion used in combination with said first code portion for control of an equipment;

at each station storing one or more code data each indicating an identification of information required for control of an equipment connected to each station and being different from said unique station address;

buffering said information on said transmission line to compare the first code portion of the information with said one or more code data stored in each station;

copying said buffered information in a memory of the station when the first code portion of the information is the same as at least one of said code data stored in the station; and passing the buffered information including the first code portion and the second data portion onto the next station, irrespective of the result of the comparison of the first code portion with the stored code data.

4. A method of communicating information through a common transmission line to which a plurality of stations are connected, the method comprising the steps of:

producing at one station a control data signal including a first code portion representative of an identification of the content of the control data signal and a second data portion used in combination with said first code portion for control of an equipment connected to another station;

sending said control data signal from said one station to said common transmission line;

storing at each of the other stations one or more code data each being representative of an identification of the content of the control data signal necessary for control of the equipment connected to each station;

buffering at each of said other stations said control data signal on the common transmission line;

comparing the first code portion of said buffered control data signal with each of said stored code data to determine whether any one of said stored code data is concurrent with said first code portion; and producing at the other stations an instruction signal only when the concurrence is determined by said comparison, for effective control of said equipment.

5. A method for communicating control information among a plurality of stations each having a unique station address and connected to a loop transmission line, comprising the steps of:

transmitting from one station, information including a first code portion, a second data portion and a third address portion, said first code portion indicating an identification of the content of said second data portion, said second data portion being used for control of an equipment connected to the station and said third address portion indicating an identification uniquely assigned to the station from which the information is to be transmitted;

at each of the other stations storing one or more code data each being indicative of an identification of the content of the information necessary for control of the equipment connected to the station and being different from the unique station address;

buffering the information sent over the loop transmission line to compare the first code portion of the information with said code data stored at each station;

copying in a memory of the station the first code portion and the second data portion of the buffered information for control of the equipment connected to the station, when the first code portion of the buffered information is detected to be the same as one of the stored code data;

passing the buffered information including said first code portion, second data portion and third address portion onto the next station in the loop, irrespective of the result of said comparison of the first code portion with the stored code data; and at said one station which transmits the information, receiving the information on the loop transmission line to delete it when the third address portion of the information is the same as the unique address of said station.

6. A method of communicating control information via a common signal transmission line to which a plurality of stations are coupled, each of said stations having a unique station address, the method comprising producing in one of said stations a control data signal containing no portion identifying the unique station address of any of the other stations, but including at least one content code signal portion representative of one of a plurality of different control operations;

sending said control data signal from said one station via said common transmission line to all other stations connected to said line;

storing in each of said stations a plurality of content codes representative of selected control operations assigned to the various stations;

receiving at each of said other stations said control data signal sent from said one station via said common transmission line;

comparing in said other stations the content code signal portion of said received control data signal with each of said plurality of stored content codes to determine whether correspondence exists between said content code signal portion and a stored content code; and processing said received control data signal only in those other stations in which correspondence is detected between said content code signal portion and a content code stored in that station.

7. A method according to claim 6, wherein the control data signal produced in said one station includes an address portion identifying the station address of said one station and said control data signal is sent via said common transmission line to said other stations in such a way that each station receives said control data signal in turn, examines the address portion of the control data signal and sends the control data signal to the next station via said common transmission line only if the address portion thereof does not correspond to its station address.

8. A method according to claims 6 or 7, wherein said step of storing a plurality of content codes in each station includes storing at least one of said content codes in more than one station.

9. A method of communicating control information via a common signal transmission line to which a plurality of stations are coupled, each of said stations having a unique station address, the method comprising producing in one of said stations a control data signal containing no portion identifying the unique station address of any of the other stations, but including at least one content code signal portion representative of one of a plurality of different control operations;

sending said control data signal from said one station via said common transmission line to all other stations connected to said line;

storing in each of said stations at least one of a plurality of content codes representative of various control operations assigned in a selected manner to said stations, at least two of said stations having stored therein the same content code;

receiving at each of said other stations said control data signal sent from said one station via said common transmission line;

comparing in said other stations the content code signal portion of said received control data signal with the stored content codes to determine whether correspondence exists therebetween; and processing said received control data signal only in those other stations in which correspondence is detected between said content code signal portion and a content code stored in that station.

10. A method according to claim 9, wherein the control data signal produced in said one station includes an address portion identifying the station address of said one station and said control data signal is sent via said common transmission line to said other stations in such a way that each station receives said control data signal in turn, examines the address portion of the control data signal and sends the control data signal to the next station via said common transmission line only if the address portion thereof does not correspond to its station address.

11. A system for communicating control information through a common signal transmission line with a high transmission efficiency, comprising a common signal transmission line, a plurality of stations coupled to said transmission line and a plurality of equipments each connected with a different one of said stations for communication of control data to one another through said stations and said transmission line, each of said equipments being capable of receiving external input signals from external terminals connected thereto to produce a first control data signal and being capable of supplying instruction signals to at least one of said external terminals or at least another external terminal connected to the equipment upon receipt of the output data of its associated station, in which:

each of said stations has a unique station address and includes means for producing said first control data signal containing no portion representing the unique station address of any other station and means for processing the output data of its associated station for producing said instruction signals, said first control data signal including a content code signal portion representative of one of a plurality of different control operations and a sub-data signal portion including data associated with the control operation designated by the control code signal portion of said first control data signal, each of said stations further including means for storing at least one content code data representative of a selected control operation for which its associated equipment is responsible, means for receiving a control data signal delivered from one of said stations through said transmission line, means for comparing said stored content code data with the content code signal portion of said received control data signal, gate means coupled with said receiving means and responsive to the output of said comparing means for passing at least said content code signal portion and said sub-data signal portion of said received control data signal as said output of the station to said associated equipment only when said compared content code data and content code signal portion are concurrent with each other, and means responsive to said first control data signal from said producing means for transmitting said first control data signal to said transmission line.

12. A system according to claim 11, in which said transmission line is in the form of a loop.

13. A system according to claim 11, in which each of said equipments includes a microprocessor programmed to produce at least the content code signal portion and the sub-data signal portion of said first control data signal and alternatively effect processing of any output of its associated station in response to a received control data signal.

14. A system for communicating control information through a common transmission line comprising, a plurality of stations coupled to said transmission line;

a plurality of equipments connected with different ones of said stations for communication of the control information with one another through said stations and said transmission lines, each of said equipments being capable of receiving input signals from external terminals connected thereto to produce a control data signal and being capable of supplying instruction signals to at least one of said external terminals upon receipt of the output data of its associated station in which:

each of said equipments includes means responsive to any one of said external input signals for producing said control data signal including a first code portion representative of an identification of content of said control data signal and a second data portion used in combination with said first code portion for controlling the equipment connected thereto;

each of said stations includes means for storing one or more code data representative of an identification of content of a control data signal necessary for controlling the equipment connected thereto, means for receiving the control data signal sent over the common transmission line, means for comparing said stored code data with the first code portion of said received control data signal, gate means connected to said receiving means and responsive to the output of the comparing means for passing said first code portion and said second data portion of said received control data signal as said output of the station to said associated equipment only when said stored code data and said first code portion are concurrent with each other, and means for transmitting said control data signal to said transmission line.

15. In a system for communicating control information via a common signal transmission line with a high transmission efficiency between plural stations connected to said transmission line, each of said stations having a unique station address and comprising:

means for producing and applying to said common signal transmission line a control data signal containing no portion relating to the unique station address of any other station and including at least one content code signal portion representative of one of a plurality of different control operations to be processed by said stations;

means for storing a plurality of content codes representative of those selected control operations to be processed by that station;

means for receiving a control data signal transmitted on said common signal transmission line;

means connected to said receiving means for comparing the content code signal portion of a received control data signal with each of said content codes in said storing means and for generating a predetermined output when correspondence is detected between said content code signal portion and any one of said stored content codes;

processor means for processing a received control data signal; and means responsive to said predetermined output of said comparing means for applying said control data signal in said receiving means to said processor means.

16. A system according to claim 15, wherein said common signal transmission line is in the form of a loop.

17. A system according to claim 16, wherein said stations are connected to said common signal transmission line with the receiving means in each station connected in series, and wherein each station further includes transmitting means connected in series with said receiving means to said common signal transmission line for transmitting the contents of said receiving means to said common signal transmission line, whereby a control data signal is transmitted from one station to the next in turn.

18. A system according to claim 17, wherein each station further includes selector means for selectively connecting either said receiving means or said producing and applying means to said transmitting means and decoder means responsive to the contents of said receiving means and said producing and applying means for controlling said selector means.

19. A system according to claims 15, 17 or 18, wherein each station further includes means for storing an address signal representing the unique station address of that station, said producing and applying means including means responsive to said address signal storing means for including in said control data signal an address portion corresponding to said stored address signal.

20. A system according to claim 19, wherein each station further includes additional comparing means connected to said receiving means and said address signal storing means for comparing the address portion of a received control data signal with the stored address signal and means responsive to said additional comparing means for erasing the control data signal in said receiving means when a comparison is detected between the address portion thereof and said stored address signal.

21. In a system for communicating control information via a common signal transmission line with a high transmission efficiency between plural stations connected to said transmission line, each of said stations having a unique station address and comprising:

means for producing and applying to said common signal transmission line a control data signal containing no portion relating to the unique station address of any other station and including at least one content code signal portion representative of one of a plurality of different control operations to be processed by said stations and one address portion representing the unique station address of that station;

means for storing at least one of a plurality of content codes representative of those selected control operations to be processed by that station;

means for receiving a control data signal transmitted on said common signal transmission line;

means connected to said receiving means for comparing the content code signal portion of a received control data signal with the content code in said storing means and for generating a predetermined output when correspondence is detected;

processor means for processing a received control data signal; and means responsive to said predetermined output of said comparing means for applying said control data signal to said processor means.

22. A system according to claim 21, wherein each station further includes additional comparing means connected to said receiving means for comparing the address signal portion of a received control data signal with the unique station address of that station and means responsive to said additional comparing means for erasing the control data signal in said receiving means when a comparison is detected by said additional comparing means.

23. A system according to claim 21 or 22, wherein said common signal transmission line is in the form of a loop and said stations are connected to said transmission line in series, whereby a control data signal is transmitted from one station to the next in turn around said loop.

* * * * *